United States Patent

Suellentrop, Jr. et al.

[15] 3,651,938
[45] Mar. 28, 1972

[54] AUTOMATIC ARTICLE SEGREGATION

[72] Inventors: Fred F. Suellentrop, Jr., Imperial; Alan A. Suellentrop, Mehlville, both of Mo.

[73] Assignee: Lemay Machine Company, St. Louis, Mo.

[22] Filed: May 18, 1970

[21] Appl. No.: 38,127

[52] U.S. Cl. ............................................. 209/78, 209/103
[51] Int. Cl. ....................................................... B07b 13/10
[58] Field of Search ................... 209/83, 115, 106, 107, 108, 209/109, 78, 103

[56] References Cited

UNITED STATES PATENTS

| | | | |
|---|---|---|---|
| 3,519,129 | 7/1970 | Peterson | 209/83 |
| 3,117,671 | 1/1964 | Pearce et al. | 209/106 |
| 2,645,342 | 7/1953 | Roberts | 209/106 X |

Primary Examiner—Allen N. Knowles
Assistant Examiner—Gene A. Church
Attorney—George J. Mager

[57] ABSTRACT

Means disposed adjacently to the delivery end of a conveyor for automatically segregating articles being delivered and directing them into separate containers. The primary component of the invention comprises a rotatably mounted cylinder spaced forwardly from the delivery end of the conveyor, and driven in the same direction. As will appear, more than one such cylinder may be employed when more than two different articles are being delivered by the conveyor. The external periphery of such cylinder or cylinders would be provided with a determined pattern of outwardly projecting elements, preferably pins pressfitted thereinto or otherwise appropriately mounted thereon, the diameter and length of said pins being variable in contemplation of the articles to be delivered by a conveyor. Likewise, the diameters of the cylinder or cylinders employed in accordance with the concepts of the present invention may be larger or smaller than that of the delivery end roller of the conveyor. Preferably although not necessarily, the cylinder or cylinders of this invention would revolve at approximately the same speed as that of the conveyor delivery end roller.

1 Claims, 12 Drawing Figures

PATENTED MAR 28 1972 3,651,938
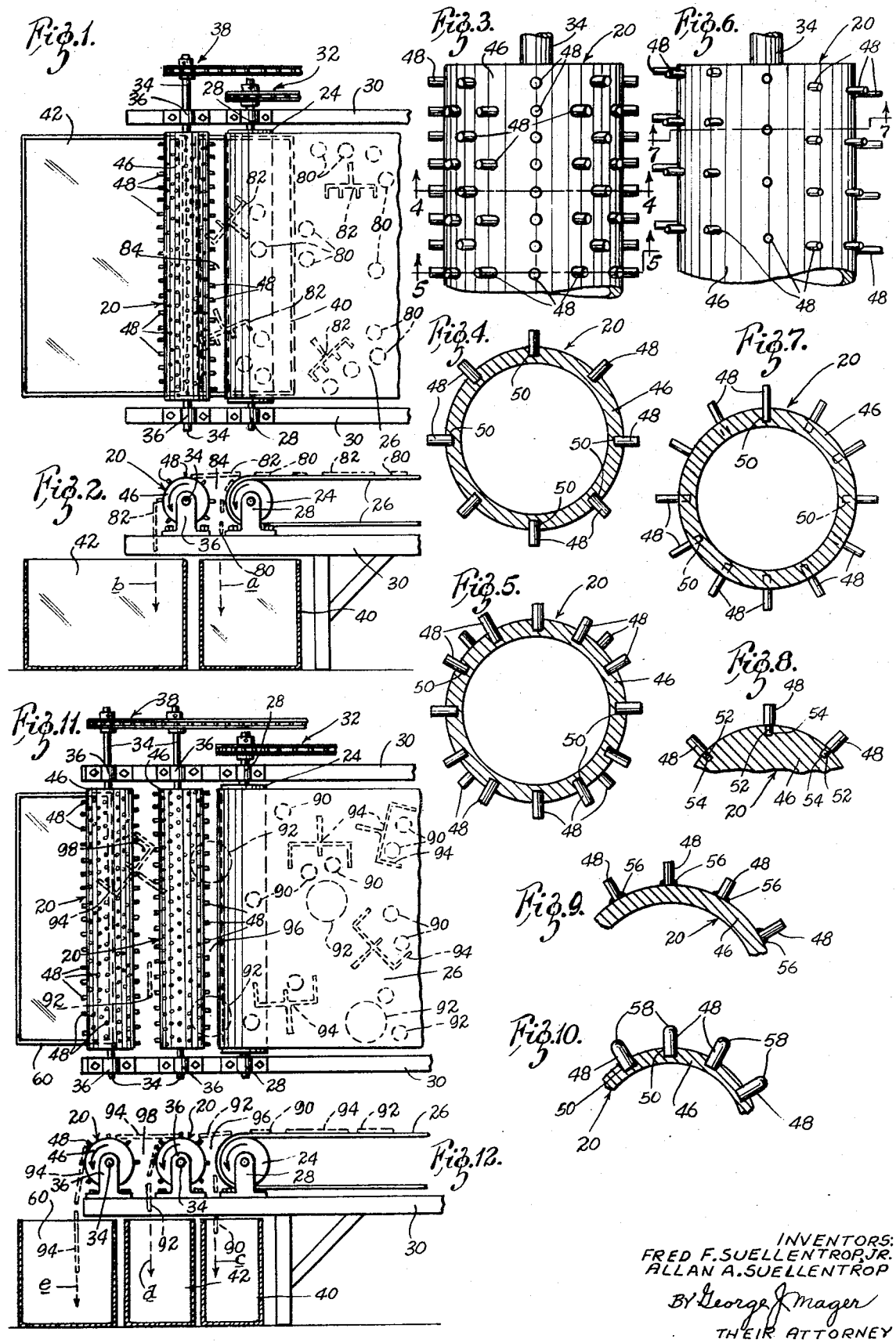
INVENTORS:
FRED F. SUELLENTROP, JR.
ALLAN A. SUELLENTROP
BY George J. Mager
THEIR ATTORNEY

AUTOMATIC ARTICLE SEGREGATION

FIELD OF THE INVENTION

Primarily, the present invention is directed to novel means adapted for use in the manufacture of molded plastic articles, although it should be understood that it is not restricted to that field. Presently, molded products together with the accompanying sprue-runner scrap material are ejected from the molding apparatus onto an appropriate conveyor that transports them to a station remote from the apparatus, where the finished articles are manually removed from the conveyor and deposited into a first bin or open container, and the scrap material into a second bin for reuse, as is well understood.

The principal objective of the present invention is to provide means wherewith such manual segregation and deposit of the articles can be accomplished automatically.

SUMMARY OF THE INVENTION

As noted hereinbefore, the major component of the present invention comprises a rotatably mounted cylinder that may be hollow or solid, and would have a length approximating the width of the conveyor wherewith it is to be associated. Generally, the diameter of said cylinder would be similar to that of the conveyor delivery roller. However, it will be understood that the diameter of the cylinder will be governed by the size and configuration of the articles to be segregated. In the event for example, that two such cylinders are employed in accordance with the concepts of the invention, the diameters of them would be determined in contemplation of the size and configuration of the articles to be segregated, as will be explained. These cylinders may be independently driven, but would preferably have a sprocket and chain connection with the motor that drives the conveyor.

Generally and preferably, the external periphery of the article segregating cylinder or cylinders of the invention will have a determined pattern of radially outwardly projecting pin members or the like appropriately integrated therewith. The lengths, diameters, and patterns of such pins would be variable. In other words, these pins may be provided at a plurality of circularly spaced points about the cylinder peripheries, each circularly spaced series may be equally spaced relatively to the next series longitudinally of the cylinder periphery, in staggered or spiral disposition and so on, as should be understood.

The invention is illustrated on a sheet of drawings that accompanies this specification. In these drawings, the basic concept is exemplarily shown in relation to an injection mold apparatus conveyor, although obviously the invention is not limited to such precise use. Features and advantages not noted hereinabove will be apparent or pointed out in the detailed description below with reference to said drawings.

BRIEF DESCRIPTION OF THE DRAWINGS

FIG. 1 is a top plan view illustrating somewhat diagrammatically, the disposition of a cylinder incorporating the teachings of the present invention relatively to the delivery end of a conveyor leading from an injection mold apparatus;

FIG. 2 is a side view of FIG. 1;

FIG. 3 is an enlarged plan view of a fragmentary portion of a cylinder incorporating a typical pattern of pin disposition;

FIGS. 4 and 5 are transverse sectional views taken respectively on the lines 4—4 and 5—5 of FIG. 3:

FIG. 6 is an enlarged plan view of a fragmentary portion of a cylinder incorporating another pattern of pin disposition, the diameters of the pins being smaller and the lengths of them being slightly longer than the pins shown in FIG. 3;

FIG. 7 is a transverse sectional view taken on the line 7—7 of FIG. 6;

FIG. 8 is a fragmentary transverse sectional view illustrating a solid cylinder with the pins having reduced depending threaded extensions engaged in the peripheral region of the cylinder;

FIG. 9 is a fragmentary transverse sectional view illustrating a cylinder of larger diameter with the pins welded to the peripheral surface of the cylinder;

FIG. 10 is a transverse sectional view illustrating pins that have their projecting extremities rounded;

FIG. 11 is a top plan view similar to FIG. 1, illustrating the disposition of cylinders when two of them are employed; and FIG. 12 is a side view of FIG. 11.

DETAILED DESCRIPTION OF THE INVENTION

With attention directed to FIGS. 1 and 2, a cylinder incorporating the principles of the present invention is generally designated 20. It is shown mounted adjacently to and forwardly of the delivery end roller 24 of a conveyor belt 26 leading from a mold injection apparatus (not shown). The roller 24 is journaled in opposed bearings 28 mounted on appropriately spaced side rails 30 of the conveyor frame, and is driven counterclockwise, (as viewed in FIG. 2), by means of a chain and sprocket connection 32 with a motor or the like, as is understood.

Integrated with the opposite ends of the cylinder 20 is a pair of laterally projecting journals 34, each journal being rotatably mounted in a suitable bearing 36 shown mounted on the side rails 30 forwardly of the bearings 28. The cylinder 20 is rotated in the same direction and preferably at approximately the same speed as the roller 24 by means of a chain and sprocket connection 38 with the same power source that drives the conveyor roller and belt.

A first open container or bin disposed below the roller 24 is designated 40. A second open container or bin 42 disposed below the cylinder 20 is designated 42. As will be explained further below, the bin 40 is so located as to automatically accumulate therein the finished molded plastic articles; the bin 42 is so located as to automatically accumulate therein the sprue-runner scrap articles.

With particular reference to FIG. 3 through 5, the there shown cylinder 20 includes, in addition to one of its journals 34, a hollow body portion 46. Pressfitted into the body 26 is a plurality of outwardly projecting pins 48 disposed in two selected circular patterns about the periphery of said cylinder. The pins 48 are pressfitted into sockets 50 provided therefor as shown.

With particular reference to FIGS. 6 and 7, the there shown cylinder 20 incorporates an exemplary spiral pattern of pin disposition. It will also be observed that the pins 48 have a greater length as well as a smaller diameter than those shown in FIGS. 3 through 6.

In FIG. 8, the body 46 of the there shown cylinder 20 is solid. The pins 48 have reduced depending threaded extensions 52 that engage in similar sockets 54 provided therefor in the peripheral body region of said cylinder.

FIG. 9 depicts a cylinder 20 having a larger diameter than those of FIGS. 3 through 8. As shown in this view, the pins 48 may be welded onto the peripheral surface of said cylinder as suggested at 56.

The contours of the pin extremities may obviously be varied in contemplation of the characteristics of the articles to be segregated. Exemplarily, the extremities 58 of the pins 48 shown in FIG. 10 are semicircular, but could be semirounded and so on, if desired.

It will be understood that more than one cylinder 20 may be employed in attaining the objectives of this invention. Thus for example, FIGS. 11 and 12 illustrate an arrangement adapted to automatically segregate three differently sized and configured articles ejected by the molding apparatus from what are known as "family" molds onto the conveyor belt. In these views, elements and parts hereinbefore described with respect to FIGS. 1 and 2 are designated by the same reference numerals, it being noted that the sprocket and chain connection 38 serves to drive both cylinders 20 in unison. Furthermore, in addition to the bins 40 and 42, a third bin 60 is shown in FIGS. 11 and 12, this bin being disposed below the foremost cylinder 20. It should also be noted that the space between the cylinders 20 is greater than that between the conveyor belt 26 and the thereto adjacent cylinder.

Use

The exemplary employment of a single cylinder 20 of the present invention will now be explained with reference to FIGS. 1 and 2. Schematically shown in broken lines and representative of variously sized and shaped molded plastic articles, is a plurality of discs that are designated 80, and a plurality of accompanying sprue-runner elements that are designated 82.

Assuming that the injection mold apparatus, the conveyor belt 26 and the cylinder 20 are in continuous operation, the articles 80 and 82 on said belt move forwardly, that is, leftwardly as viewed in these drawings.

The transverse space 84 between the delivery end of the conveyor 26 and the cylinder 20 is determined, so that the articles 80 slide off the conveyor and drop by gravity into the first bin 40, as indicated by the broken line arrow $a$. The articles 82 however, are propelled across the space 84 toward the rotating cylinder 20 and onto some of the pins 48 thereof, whereupon these articles are carried forwardly until they drop from the cylinder into the second bin 42, as indicated by the broken line arrow $b$. Thus, it should be apparent that the segregation and accumulation of the different articles is accomplished automatically.

The exemplary employment of two cylinders 20 of the present invention will be explained with reference to FIGS. 11 and 12. Schematically shown in broken lines and representative of variously sized and shaped molded plastic articles, is a plurality of discs that are designated 90, a plurality of larger discs that are designated 92, and a plurality of accompanying sprue-runner elements that are designated 94.

Assuming that the mold apparatus, the conveyor belt 26, and both cylinders 20 are in continuous operation, the articles 90, 92 and 94 move forwardly, that is leftwardly as viewed in these drawings.

The transverse space 96 between the delivery end of the conveyor 26 and the first cylinder 20 is determined, so that the articles 90 slide off the conveyor and drop by gravity into the first bin 40, as indicated by the broken line arrow $c$. The articles 92 however, are propelled across the space 96 toward the first rotating cylinder 20 and onto some of the pins 48 thereof, whereupon these articles are carried forwardly until they fall from said first cylinders and drop by gravity into the second bin 42, as indicated by the broken line arrow $a$.

Inasmuch however, as the space 98 between the first and second cylinders 20 is determined to accommodate passage therethrough of articles 92 but not articles 94, these larger articles are propelled across the space 98 toward the second rotating cylinder 20 and onto some of the pins 48 thereof, whereupon the articles 94 are carried forwardly until they fall from said second cylinder and drop by gravity into the third bin 60, as indicated by the broken line arrow $e$.

In view of the foregoing description and the accompanying drawings, it should be apparent that the present invention provides means whereby heretofore manual segregation of articles may be dispensed with, the segregation being effected automatically.

We claim:

1. A conveyor leading from a mold injection apparatus for transporting molded articles together with the accompanying sprue-runner scrap material from the mold apparatus to a station remote from said apparatus, the delivery end portion of said conveyor being trained over a roller journaled in opposed bearings mounted on appropriately spaced side rails of the conveyor frame, the roller being driven to propel the upper stretch of the conveyor in a forward direction away from the mold apparatus, means for automatically segregating the molded articles and sprue-runner scrap elements and directing them into separate containers, said means comprising:

at least one cylinder disposed in determined spaced relationship forwardly of the delivery end of said conveyor, the body of the cylinder having a diameter similar to that of the aforesaid delivery end conveyor roller and being transversely at least coextensive with the width of the conveyor, a journal projecting from each end of the cylinder body and rotatably supported in a bearing mounted on one of said rails of the conveyor frame, means associated with the end of one of said journals for driving the cylinder in the same direction and at approximately the same speed as that of the conveyor delivery end roller, and a plurality of circularly and transversely spaced pin elements integrated with and projecting radially outwardly from the body of the cylinder, whereby the molded articles slide off the conveyor into the space provided between the conveyor end and the periphery of said cylinder to drop by gravity into a first container, whereas the sprue-runner scrap elements are propelled across said space onto the cylinder and carried forwardly by said pin elements until the said sprue-runner elements drop by gravity into a second container.

* * * * *